O. W. BRENIZER.
ABRADING MACHINE.
APPLICATION FILED OCT. 31, 1908.

922,382.

Patented May 18, 1909.

Witnesses
A. Rettig.
E. G. Farley

Inventor
Orson W. Brenizer
By
Attorney

UNITED STATES PATENT OFFICE.

ORSON W. BRENIZER, OF PHILADELPHIA, PENNSYLVANIA, ASSIGNOR TO AMERICAN FRUIT MACHINERY CO., INCORPORATED, A CORPORATION OF DELAWARE.

ABRADING-MACHINE.

No. 922,382.　　　　　Specification of Letters Patent.　　Patented May 18, 1909.

Application filed October 31, 1906. Serial No. 460,411.

*To all whom it may concern:*

Be it known that I, ORSON W. BRENIZER, a citizen of the United States, and a resident of the city and county of Philadelphia, State of Pennsylvania, have invented an Improvement in Abrading-Machines, of which the following is a specification.

My invention has reference to method of forming abrading surfaces and consists of certain improvements which are fully set forth in the following specification and shown in the accompanying drawings which form a part thereof.

More specifically, my invention has special use in connection with the making of abrading surfaces for machines for paring or removing the skin of vegetables and fruit, but may be employed for removing the outer portions of any easily detachable substance from the inner or body part.

The object of my invention is to provide a method for making an inexpensible construction of abrading surface which shall embody durability.

My invention consists in a method for producing an abrading surface, preferably irregular and of metal, combined with a coating of carborundum, emery or other refractory substance in small granules, held in place by a suitable japan having strong adhering qualities and baked in position.

My invention further consists in coating a surface with a fluid layer capable of being hardened by baking, depositing upon and into the fluid layer grains of an abrading substance such as carborundum, coating the layer so formed when set and hardened with a second fluid layer to fill to a more or less degree the spaces between the abrading substance, and finally hardening the abrading surface by baking.

Figure 1:
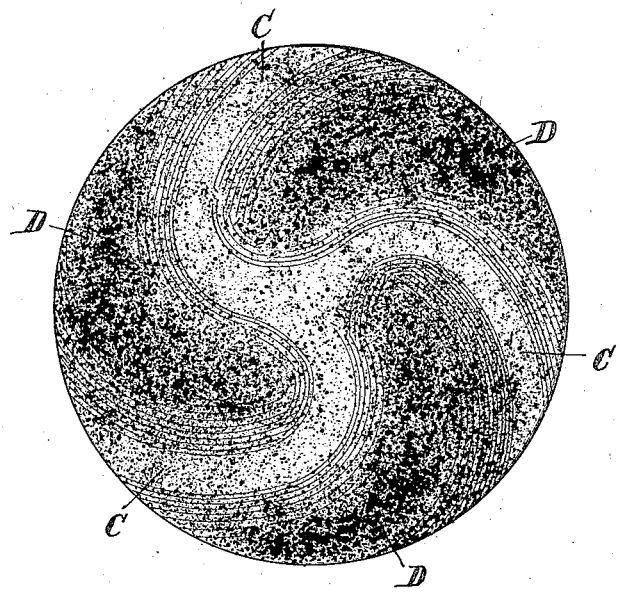
Figure 2:
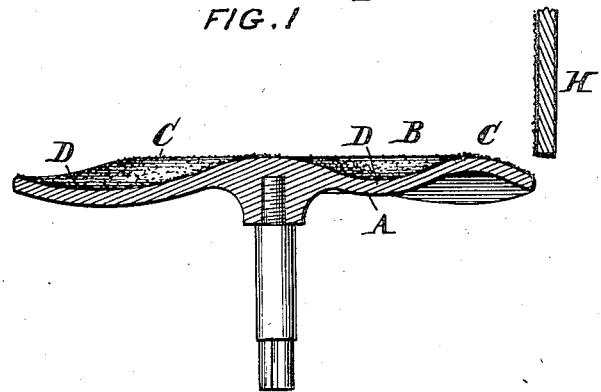

My invention also comprehends details which, together with the features above specified, will be better understood by reference to the drawings, in which:

Figure 1 is a plan view of an abrading disk embodying my invention; Fig. 2 is a transverse section of the same; and Fig. 3 is an enlarged cross sectional view of a portion of the same for more clearly disclosing the preferred structure thereof.

A is a disk of metal or other material and is adapted to be rotated by a spindle when associated with the means (not shown) for supporting and guiding the vegetables, fruit or other material to be treated. This disk may have its surface of any suitable shape, that shown having a plurality of spiral waves C extending from the center with intermediate depressions or valleys D. These irregularities provide abrading portions for positive action upon the vegetable or fruit which rest against the abrading surface and at the same time cause a feeding action upon said materials, whereby they are kept in motion and, constantly present different portions to the rotating abrading surface.

Figure 3:

B is the abrading surface, the preferred construction of which is shown in Fig. 3. The surface I of the disk A is preferably cast in a roughened condition and this is coated with japan as at F. Upon this japan the abrading grains E of carborundum are dusted or sprinkled and into which they embed themselves and assume fixed positions. As soon as the japan is sufficiently set it is baked in a japanning oven. The japan used may be of the ordinary composition but I prefer to add to it some hard oil, with or without some shellac varnish, which has the capacity of giving to the japan layer the property of great tenacity, adhering qualities and less brittleness, all of which are most important and desirable to the durability of my improved abrading device. As most of the carborundum grains are not over deeply embedded in the japan layer F, I prefer to coat the carborundum and layer F with a second or reinforcing layer G of similar japan and this is also baked hard so that it adheres strongly to the first layer F and to the abrading grains E well up around their bodies whereby in effect, they are dovetailed into the japan layers and thus very strongly held to the surface of the disk. The secondary layer I prefer to have a somewhat harder surface than the primary layer and hence may add to the black baking japan and hard oil, some shellac varnish, the latter giving a harder body while the hard oil retains the tenacity of the japan. As to proportions of these substances, they may be varied, but for ordinary use one-half pint of the hard oil and one-half pint of the shellac varnish may be used to one quart of black baking japan. Any other compound of japan or its equivalent may be employed.

By employing japan in the above manner, it is evident that, notwithstanding the disk is irregular and with rounded surfaces, the carborundum, emery or other abrading grains are cemented in position wherever deposited, because the japan sets so quickly as not to run from the high to the low portions of the surface.

While I have described my invention with respect to the disk A, the abrading surface may be either movable or fixed and of any shape, a fixed surface being shown at H in Fig. 2 and provided with my improved abrading structure.

An abrading surface formed in the manner above described has great durability, is cheaply and quickly constructed and retains its abrading qualities throughout its surface with great evenness.

While I have shown my invention more particularly in the form of a rotatable disk, it is to be understood that it may be made with any other shape of moving or static surface, as will be understood by those familiar with abrading machines of the character referred to herein; and while I refer to japan in a general sense, it is evident that such term is to be understood as including all equivalent substances which may be hardened by baking and likewise, instead of hard oil and shellac, any equivalent substitutes therefor may be employed.

In this application I make no claim to the structure as the same will form subject matter of another application.

Having now described my invention what I claim as new and desire to secure by Letters Patent, is:

1. That improvement in the art of forming an abrading surface which consists in coating a surface with a fluid layer capable of being hardened, depositing upon and into the fluid layer a hard abrading substance in granular form and allowing the fluid layer to become hard, then coating the abrading surface so formed with a second fluid layer to fill to a more or less degree the spaces between the abrading substance, and finally hardening the layers which bind the abrading substance to the surface by subjecting them to heat.

2. That improvement in the art of forming an abrading surface which consists in coating a surface with a fluid layer capable of being hardened by baking, depositing upon and into the fluid layer a hard abrading substance in granular form, baking the fluid layer until it becomes hard, then coating the hardened abrading surface so formed with a second fluid layer to fill to a more or less degree the spaces between the abrading substance, and finally hardening the second layer by baking.

3. That improvement in the art of forming an abrading surface which consists in coating a surface with a mixture of japan, and a substance to reduce its brittleness when baked, embedding in the surface of the japan grains of a hard abrading substance, and finally baking the prepared surface until the japan becomes hard.

In testimony of which invention, I have hereunto set my hand.

ORSON W. BRENIZER.

Witnesses:
R. M. HUNTER,
A. W. RETTIG.